Oct. 7, 1924.
G. M. BICKNELL
1,510,453
FUEL FEED FOR INTERNAL COMBUSTION ENGINES
Filed March 11, 1922 3 Sheets-Sheet 1
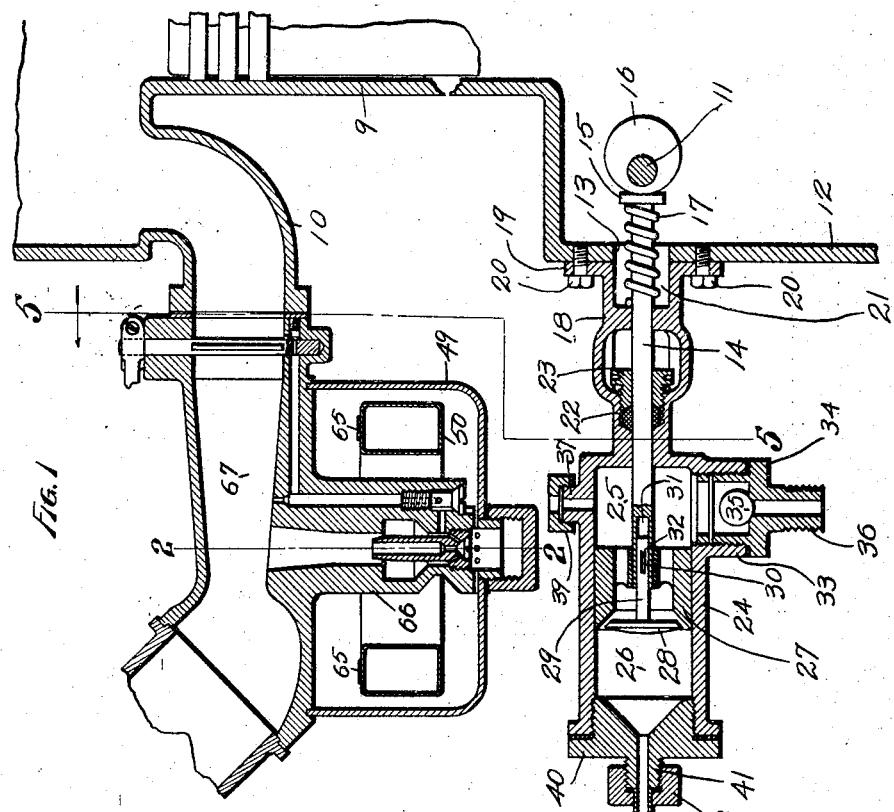
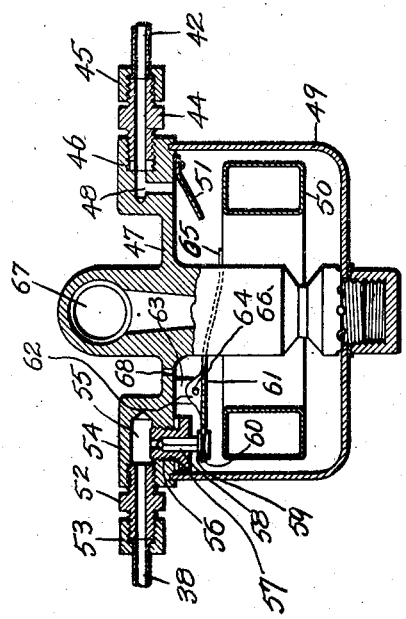
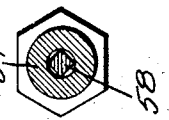
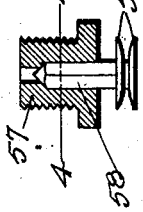
INVENTOR
GEORGE M. BICKNELL
BY
ATTY.

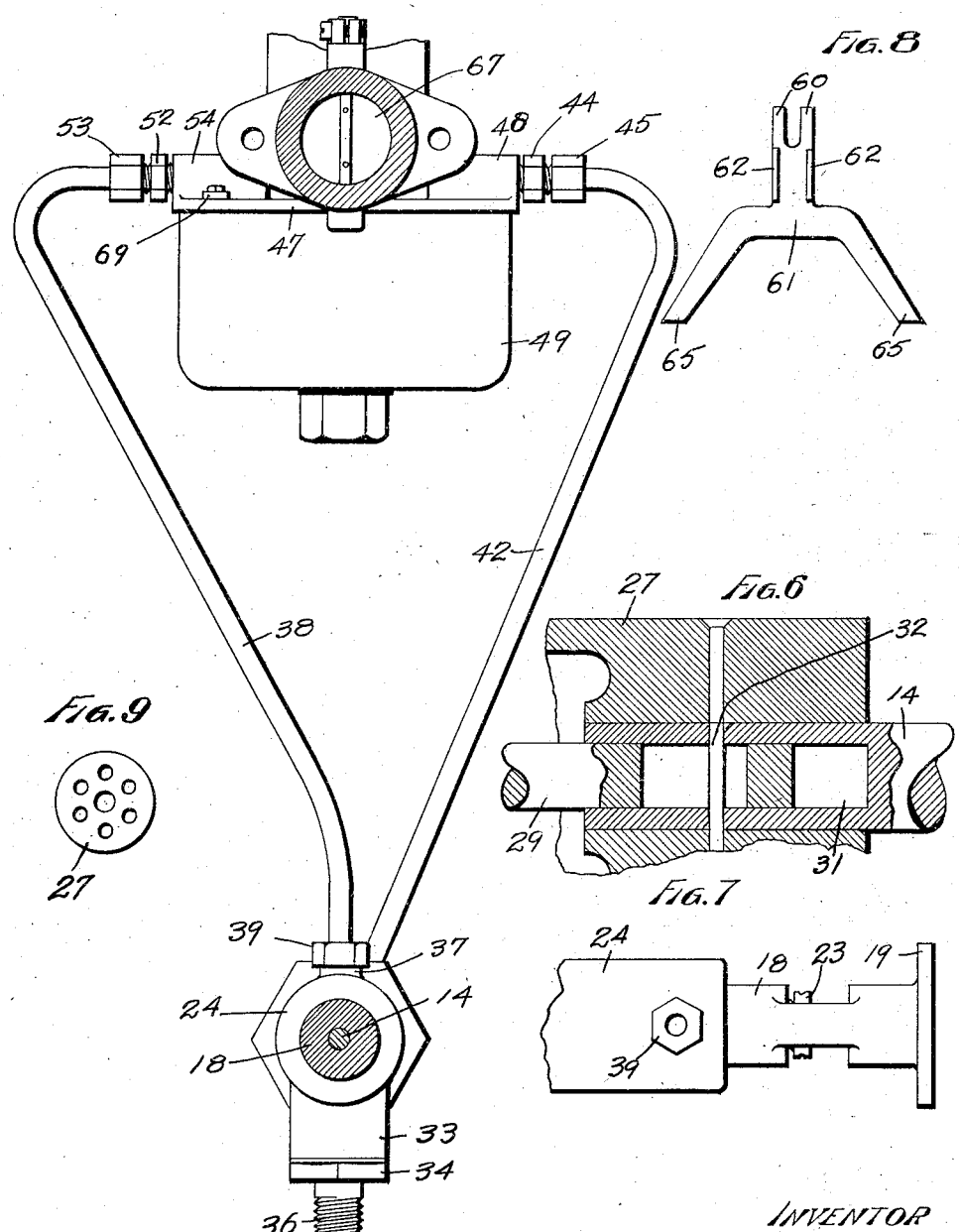

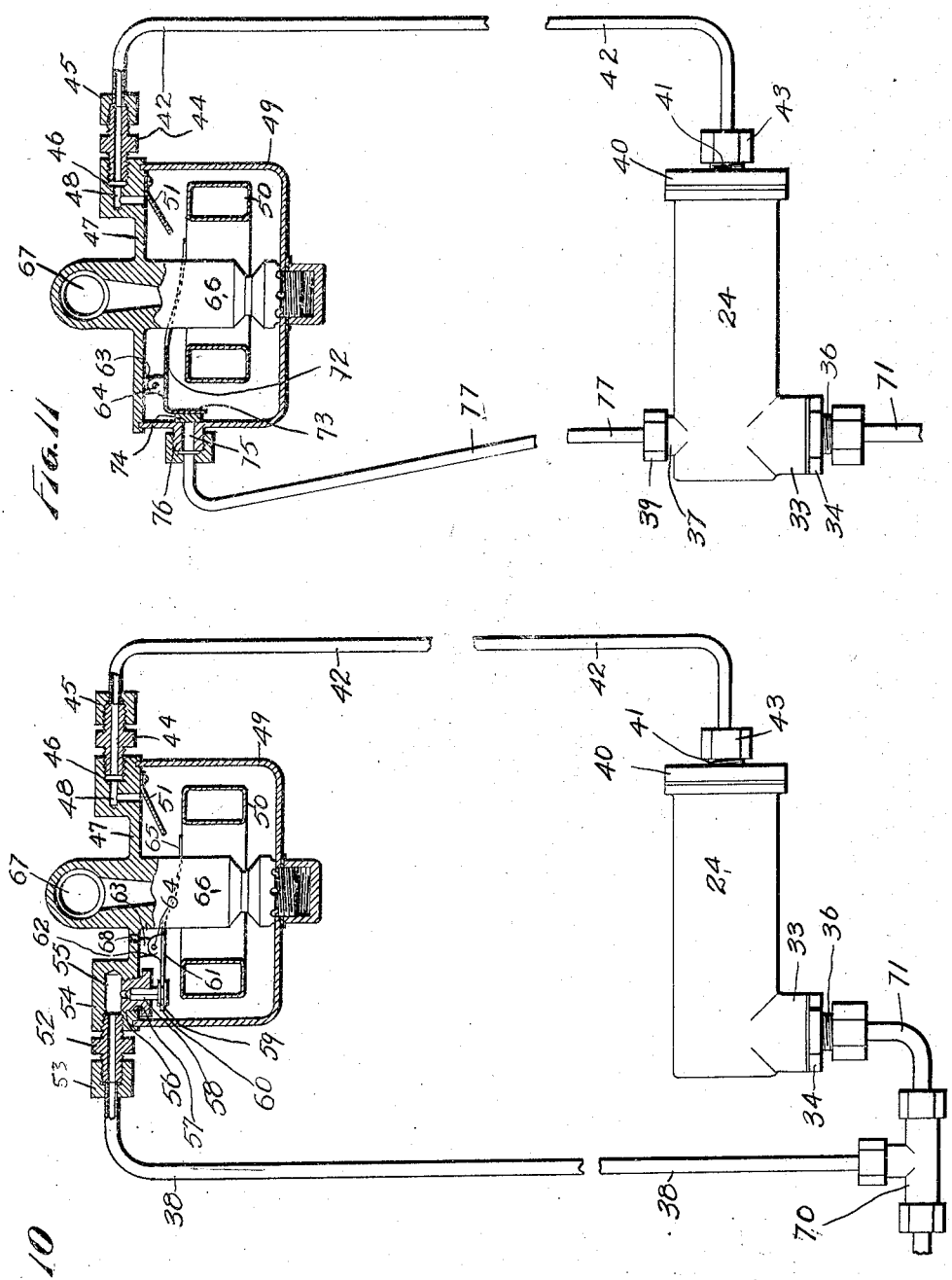

Patented Oct. 7, 1924.

1,510,453

UNITED STATES PATENT OFFICE.

GEORGE M. BICKNELL, OF ST. LOUIS, MISSOURI.

FUEL FEED FOR INTERNAL-COMBUSTION ENGINES.

Application filed March 11, 1922. Serial No. 542,854.

*To all whom it may concern:*

Be it known that I, GEORGE M. BICKNELL, a citizen of the United States, and resident of the city of St. Louis and State of Missouri, have invented certain new and useful Improvements in Fuel Feed for Internal-Combustion Engines, of which the following is a specification containing a full, clear, and exact description, reference being had to the accompanying drawings, forming a part hereof.

My invention relates to improvements in fuel feed for internal combustion engines, and has for its primary object a fuel feed which will maintain practically a constant fuel level within the float chamber of a carbureter regardless of engine speed or throttle opening.

A further object is to construct a fuel feed for internal combustion engines wherein a very short intake manifold can be used, thus overcoming the condensation of the explosive mixture between the carbureter and combustion chamber of the engine.

In the drawings,

Fig. 1 is a fragmental section of my device.

Fig. 2 is a cross section taken on the line 2—2 of Fig. 1.

Fig. 3 is an enlarged fragmental cross section of the air valve made use of.

Fig. 4 is a cross section taken on the line 4—4 of Fig. 3.

Fig. 5 is a vertical section taken on the line 5—5 of Fig. 1.

Fig. 6 is an enlarged fragmental section of the piston, valve stem and operating shaft.

Fig. 7 is a top plan view of the rear portion of the pump.

Fig. 8 is a top plan view of the air valve operating yoke or lever.

Fig. 9 is a rear view of the piston.

Fig. 10 is a modified form of construction showing the carbureter in section in which air is admitted directly to the suction line; and Fig. 11 is a similar view of another modification showing a means whereby fuel from the float chamber is returned to the suction chamber of the pump when a predetermined level is reached.

In the construction of my device I employ an internal combustion engine having a cylinder 9, an intake manifold 10, a cam shaft 11, and a crank case 12. The crank case 12 is provided with an opening 13 through which extends an operating shaft 14. This operating shaft is provided with an enlargement 15 which is held against the cam 16 by means of a coil spring 17 which surrounds the shaft 14. Secured to the crank case 12 is a stem 18 which is provided with a flange 19 through which bolts 20 pass. These bolts are secured within screw threaded openings formed in the crank case. The stem 18 is provided with an opening 21 so as to form a pocket in which the spring 17 is seated. The stem 18 is further provided with a screw threaded recess 22 in which a packing nut 23 is secured, which prevents seepage along the operating shaft 14. A portion of the stem 18 is cut away, (see Figs. 1 and 7,) so that access can be had to the packing nut 23 for tightening and also for repacking the shaft. Formed integral with the stem 18 is the pump housing 24 which is provided with a suction chamber 25 and a pressure chamber 26. Placed between these chambers is a piston 27, having a valve seat against which the valve 28 is designed to be seated. The valve 28 is provided with a valve stem 29 which has formed therein a slot 30. The shaft 14 is provided with a cylindrical recess or bore 31, in which a portion of the valve stem 29 is seated. The valve stem 29 is held in position by means of a pin 32 which also secures the piston to the shaft 14 and allows a certain amount of lateral play to the valve 28, but at the same time retains the valve stem within the recess 31. The pump housing 24 is provided with an internally screw threaded boss 33. This boss opening into the suction chamber 25, and in this screw threaded boss is secured a nipple 34. This nipple is provided with a check valve 35 and with an externally screw threaded portion 36 to which is attached a suction line leading to the source of fuel supply. This pump housing is also provided with a second boss 37 which is externally screw threaded, and to which is secured an air line 38. This air line being secured by means of the nut 39. The pressure chamber 26 is screw threaded at its forward portion and in this screw threaded portion is seated a head 40, which head is provided with a screw threaded boss 41, to which is attached a fuel line 42, by means of the nut 43. The fuel line 42 is in turn secured to the nipple 44 by means of a nut 45. This nipple 44 is in turn secured within the boss 46 formed integral with the main body 47 of the carbureter which also acts as a top for the float chamber. This boss is provided with a passage 48 which communicates with a float chamber 49. This float chamber is provided with a float 50 which raises and lowers with the liquid level in the chamber, and in order to prevent incoming fuel from striking the float, a deflector or shield 51 is secured to the main body 47 so that fuel entering through the passage 48 will fall thereon and be guided clear of the float. The air line 38 is secured to the nipple 52 by means of the nut 53. The nipple 52 is secured in the boss 54 which is likewise formed integral with the main body or top 47 of the float chamber. The boss 54 is provided with an opening 55 and with the screw threaded opening 56. These openings communicating with each other and at right angles to each other. Within the screw threaded opening 56 is secured the valve seat 57, and in this valve seat is located a needle valve 58. This needle valve is preferably square, while the opening in which the square portion is located is circular in cross section, so that the valve 58 is guided, but still will permit air to pass therethrough. Formed integral with the valve 58 are flanges 59. These flanges are spaced apart and receive the forked end 60 of the lever or yoke 61. This lever or yoke is provided with perforated ears 62 which are pivoted to the ears 63, formed integral with the main body, by means of a pin 64. The lever 61 is forked at its rear portion—the ends 65 of which are secured to the float 50.

My purpose in forking the rear end of the lever is so that it can straddle the depending portion 66 of the main body 47. This depending portion containing the fuel nozzles which deliver the fuel to the passage 67. The main body 47, or top of the float chamber forms the main body of the carbureter, is also provided with an air vent 68. This air vent allows air to be drawn into the air line 38 when the valve 57 has been unseated by the raising of the float 50. This permits air to be drawn into the suction chamber 25 of the pump, and destroys or lessens the pumping action or suction until such time that the valve has again become seated and the air closed off.

The operation of my device is as follows:

After the carbureter and pump have been installed, and the proper pipe connections made, the engine is turned over either by hand or by a starter. This turning over of the engine operates the rod 14, which in turn moves the piston 27 backward and forward in the pump housing. This backward and forward movement creates a suction in the suction chamber 25 as the forward movement of the piston seats the valve 28 against the valve seat, while the backward movement allows it to rise from the valve seat and permits the passage of liquid through the openings formed in the piston and around the valve. The suction created by the piston draws fuel from the main reservoir or fuel supply and unseats the check valve 35 and on the backward stroke of the piston this valve 35 is closed, preventing the fuel from returning to the main supply tank and causing it to unseat the valve 28. On the forward movement the valve is again seated and forces the fuel contained in the pressure chamber 26 into the float chamber. As the fuel is forced into the float chamber it raises the float 50 with it. This raising of the float unseats the valve 58 and allows air which has entered through the air vent 68 to be drawn into the air line 38, from where it passes into the suction chamber. In this way the lifting action or suction of the pump is destroyed or lessened and no fuel, or practically none will be raised until the valve 58 is again seated by the lowering of the float 50, when the suction of the pump is again transferred to the line running to the source of fuel supply. The check valve 35 also prevents any fuel which may be in the pump from running back into the source of fuel supply.

I may also if desired, place a plug 69 in the main body 47 of the carbureter. The purpose of this plug is to permit priming or charging of the float chamber with fuel, previous to starting the engine. This will allow the carbureter to furnish fuel to the engine immediately, and eliminate the several strokes necessary to elevate fuel to the carbureter as the engine is already working, and before the fuel in the float chamber has exhausted, the pump will commence to supply fuel thereto.

While I have shown my device as being operated from a cam shaft, yet it is obvious that the pump can be run in various other ways, either from the fan shaft, or from the distributor shaft, or from the main crank shaft, without departing from the spirit of my invention.

It will be readily seen that the action of my device is at all times positive, regardless of throttle opening or speed in the engine, and the fuel feed from the fuel tank to the carbureter is directly controlled by the speed of the engine, and not by gravity, air pressure, or vacuum feed. Furthermore, as the carbureter is located above the fuel supply there is no danger of the carbureter flooding and running over when the engine is at rest, since there is no possible way to get fuel to the carbureter without starting the engine. This eliminates waste of fuel which has frequently happened where either the gravity, air pressure, or vacuum tank feed was made use of. The vacuum tank feed being only a modified form of gravity feed, so that there is always a possibility of losing at least the fuel contained in the vacuum tank in case the carbureter float valve became stuck, and in the pressure system a lost or leaky cap or leak in the fuel line will destroy its utility as the pressure is lost.

It is also obvious that any other type of pump than that shown, can be used to accomplish my purpose.

In the construction shown in Fig. 10 the air line 38 is connected to a T 70, this T is preferably located in the suction line 71 although it can be connected directly to the projection 36. In this construction when the float 50 unseats the needle valve 58, air is drawn through the pipe 38 by the action of the pump 24, this destroys the lifting action of the pump and no more fuel will be pumped from the main reservoir until the valve 58 is again seated thus closing the air line 38 and allowing the pump to again draw liquid from the main reservoir.

In the construction shown in Fig. 11, I make use of a bifurcated lever 72 which is pivoted in the same manner as the lever 61, one end of this lever is secured to the float 50 and the other end is bent at right angles, as indicated by the numeral 73, this right angular bent portion of the lever 72 is provided with a pad 74, this pad is so arranged as to close the passage way 75, which is formed in the screw threaded boss 76 formed integral with the float chamber. To the screw threaded boss is secured one end of a pipe 77, the opposite end of the pipe is secured to the screw threaded boss 37, formed integral with the pump. In this device when a predetermined fuel level has been reached in the float chamber 49, the float 50 unseats the pad 74 and allows the fuel to flow back into the pump through the pipe 77, in this way the fuel is circulated between the float chamber 49 and pump 24, the fuel being fed back to the pump by gravity destroys the lifting action of the pump so that no fuel will be drawn from the main reservoir until the fuel level in the float chamber is sufficiently reduced to seat the valve or pad 74, after which the suction of the pump is again transferred to the suction line 71 leading to the main reservoir.

Having fully described my invention, what I claim is:

1. A fuel feed for internal combustion engines comprising a carbureter having a float chamber, a pump, a suction chamber formed in said pump, a pressure chamber formed in said pump, a fuel line connected to said pressure chamber and float chamber, an air line connected to the suction chamber and float chamber, an air vent formed in the float chamber, means for operating said pump, a float located in said float chamber, and a valve operated by said float for opening said air pipe and admitting air into the suction chamber of the pump when a predetermined level of fuel in the float chamber has been reached, whereby the action of said pump is temporarily destroyed.

2. A fuel feed for internal combustion engines comprising an engine, a carbureter having a float chamber formed integrally therewith, a float located in said chamber, a source of fuel supply, a pump, a pipe connection between the fuel supply and pump, a second pipe connection between the pump and float chamber, a float located in said float chamber, an air vent in said float chamber, an air pipe connected to said float chamber above the float and to the suction end of the pump, a valve located in said float chamber for opening and closing said air pipe and actuated by said float, whereby the suction of the pump is destroyed when a predetermined fuel level is reached in the float chamber, and means for operating said pump.

3. The fuel feed for internal combustion engines of claim 2, in which the float chamber is provided with a shield to prevent the incoming fuel from striking the top of the float.

In testimony whereof, I have signed my name to this specification.

GEORGE M. BICKNELL.